Figure 1:
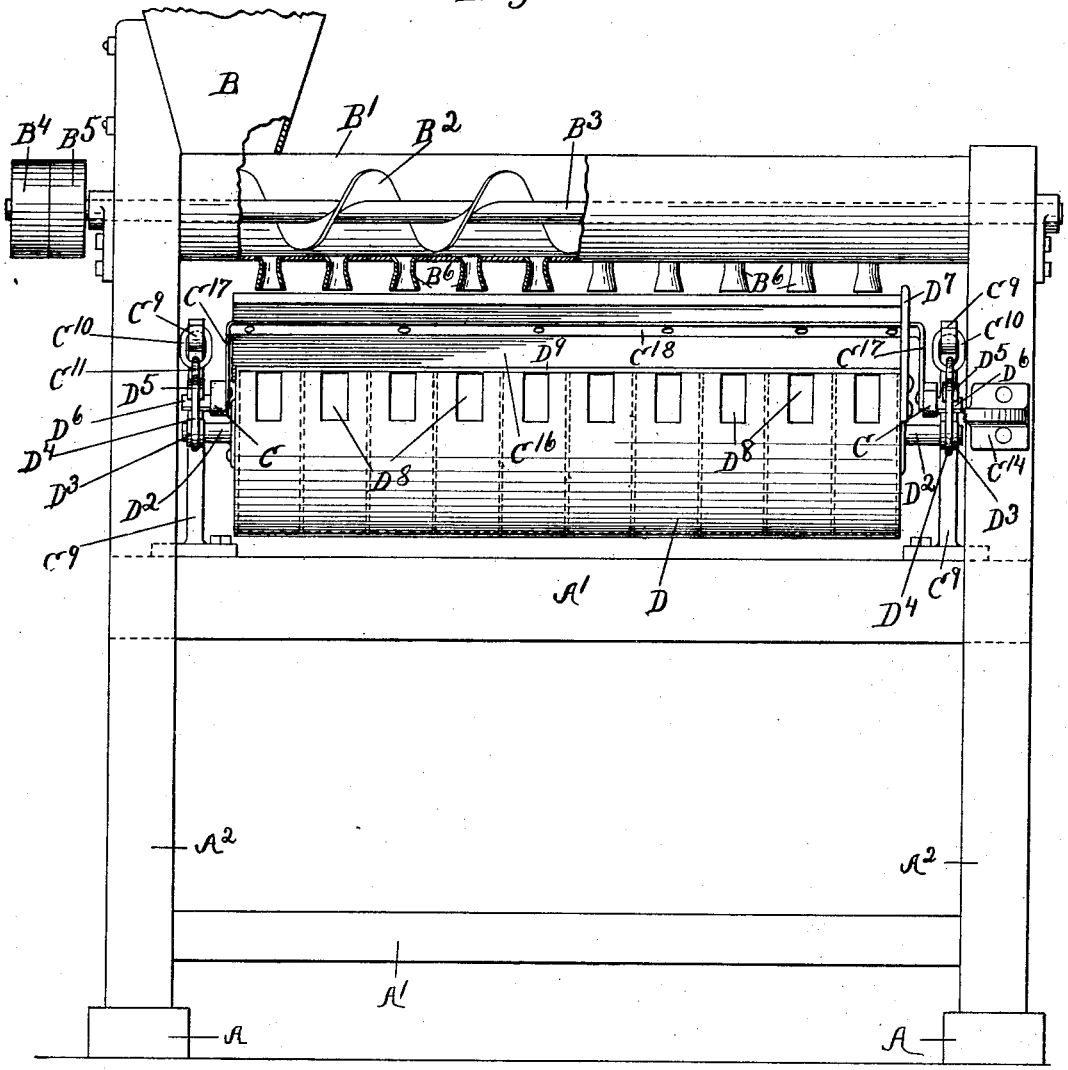

No. 737,058. PATENTED AUG. 25, 1903.
A. M. BATES.
MEASURING DEVICE.
APPLICATION FILED SEPT. 10, 1902.
NO MODEL. 2 SHEETS—SHEET 1.

Witnesses.
Edward T. Wray.
Weston B. Hagar.

Inventor.
Adelmer M. Bates.
by Parker Carter
Attorneys

A. M. BATES.
MEASURING DEVICE.
APPLICATION FILED SEPT. 10, 1902.
NO MODEL.
2 SHEETS—SHEET 2.
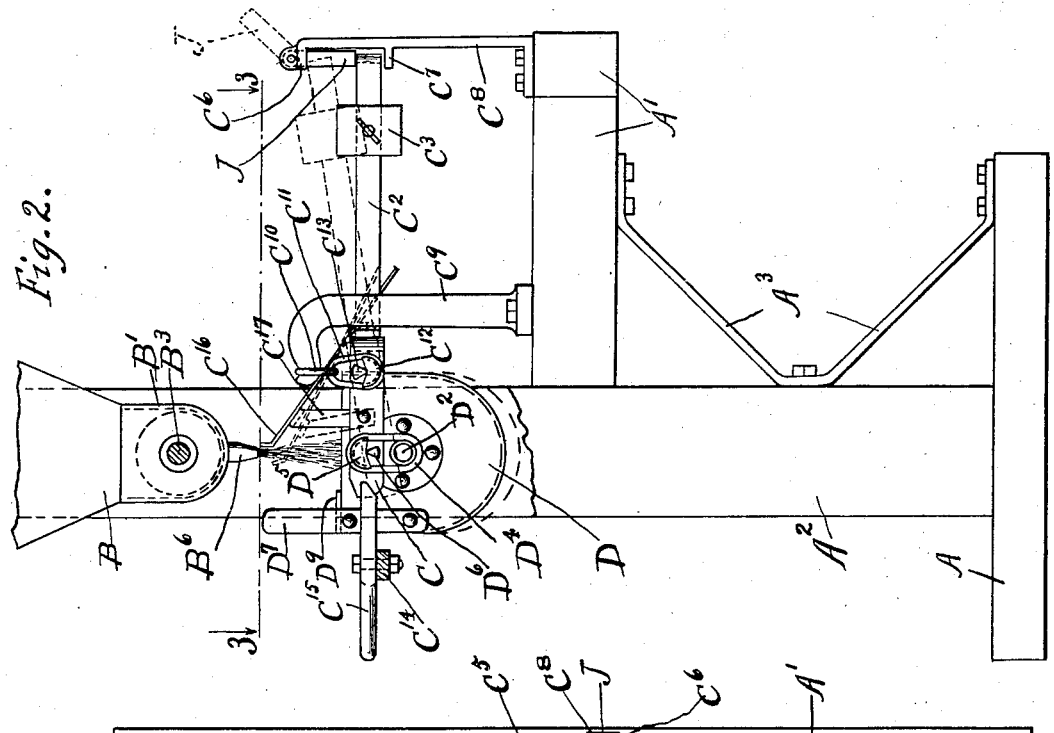
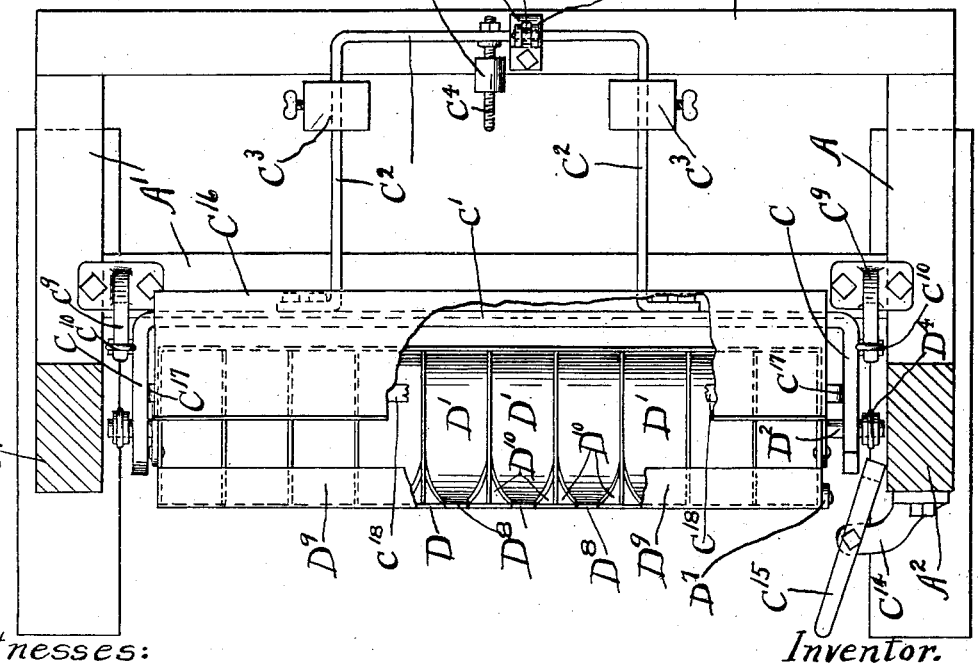
Witnesses:
Edward T. Wray.
Weston B. Lazear.
Inventor.
Adelmer M. Bates.
By Parker & Carter
Attorneys.

No. 737,058. Patented August 25, 1903.

UNITED STATES PATENT OFFICE.

ADELMER M. BATES, OF CLEVELAND, OHIO.

MEASURING DEVICE.

SPECIFICATION forming part of Letters Patent No. 737,058, dated August 25, 1903.

Application filed September 10, 1902. Serial No. 122,757. (No model.)

*To all whom it may concern:*

Be it known that I, ADELMER M. BATES, a citizen of the United States, residing at Cleveland, in the county of Cuyahoga and State of Ohio, have invented a certain new and useful Improvement in Devices for Determining the Amount of Materials for Packages, of which the following is a specification.

My invention relates to machines for determining the amount of materials for packages. It has particular reference to cases where a considerable number of small amounts are to be taken from a bulk, or, in other words, where, for example, a hundred pounds of material is to be divided into twenty five-pound packages.

It is well known that all ordinary apparatuses are accompanied in operation by a factor of error, and this is particularly true of weighing devices. Thus in ordinary practice a scale intended to indicate a certain quantity will make practically in every instance a certain error, which error is of course variable—as, for example, a scale which is intended to weigh out five pounds of sugar will weigh 5.1 pounds on one action and on the next action 4.99 pounds, and so on through a series of operations. The personal equation of the operator also applies. In the filling of small packages which are to be distributed on a large scale—as, for example, in the filling of packages of sugar, salt, flour, and the like—this error would become a matter of great importance to the manufacturer or dealer and is a thing to be minimized, for the presence of such errors greatly hampers and interferes with the use of devices for selling or distributing such materials in small packages, because of the well-grounded apprehension of the dealer or manufacturer that an element of uncertainty will be introduced into his business by the employment of such small packages. This is particularly applicable in the case of dealers in sugars and other valuable products. I find that by weighing the material in question in a large quantity and then distributing this quantity to a series of small packages I greatly minimize the error, for the larger weighing apparatus can be made to work in practice more accurately than the smaller weighing device and can be handled more carefully, and its error, if any results, is distributed over the entire series of small packages or measures. The material may be fed to a series of smaller receptacles from a general supply, cutting off the feed when a certain amount, by weight, has passed into all of the smaller receptacles, the cut-off applying to all of them, although each may not have the same amount of material as the other.

I have illustrated my invention in a partly diagrammatic way, intending to thus suggest in a particular way the nature of my invention, and I have then followed these by illustrations of machines embodying some of the features of my invention and in part carrying out this process. I wish to have my drawings taken as in the broadest sense diagrammatic and not as limiting my invention to any particular form which it may have assumed in my drawings.

Figure 1 is a front elevation, with parts cut away, of one form of my device. Fig. 2 is a side elevation of the same with parts broken away and parts shown in dotted lines. Fig. 3 is a sectional plan view of the same section, being made on the line 3 3 of Fig. 2.

Like parts are indicated by the same letters in all of the figures.

A A are the base-boards.

A' A' are the cross-pieces; $A^2$ $A^2$, the standards of the frame of my machine. The parts may be properly attached together by the braces $A^3$ $A^3$.

B is a hopper or supply-chamber suitably supported on the frame and opening into the tube B', in which rotates the worm $B^2$ on the shaft $B^3$ and which is journaled in the standards and is controlled by means of the pulleys $B^4$ $B^5$. From the bottom of the tube-like part B' project the discharge-openings $B^6$ $B^6$.

I provide a scale-beam composed of the forwardly-projecting parts C C, the bar C', which connects them together, and the rearwardly-projecting loop-shaped piece $C^2$. On the two arms of this loop-shaped piece $C^2$ are placed adjustable weights $C^3$ $C^3$, and the cross portion contains the threaded bolt $C^4$, with the weight $C^5$ thereon. This cross-piece also is adapted to oscillate between the lugs $C^6$ and $C^7$ on the standard $C^8$, which rises from the cross-beam A'.

Upwardly rising from the cross-pieces A' A' are the boards $C^9$ $C^9$, hook-shaped at their outer ends and provided with links $C^{10}$, hanging upon such hooks, each link carrying a link $C^{11}$, with a pivot-block $C^{12}$ in the lower part thereof. Each part C of the beam is provided with a laterally-projecting knife-shaped bearing-piece $C^{13}$, which is received in the block $C^{12}$, so as to form a fulcrum for the scale-beam.

From the standard $A^2$ projects the bracket $C^{14}$, in which is pivoted the lever $C^{15}$, the inner end of which may be projected into the path of the beam end C when the latter is in the position shown in dotted lines in Fig. 2, so as to hold it down in that position. Supported on the end C C of such beam is the deflector-plate $C^{16}$. This may be supported by means of the arms $C^{17}$ and cross-piece $C^{18}$.

I will now describe the receptacle device. In this case it consists of the long box-like portion D, provided with the compartments or receptacles D' D' and the end trunnions $D^2$ $D^2$, which are pivoted in the blocks $D^3$ $D^3$, which are supported in the links $D^4$ $D^4$, which links are provided with blocks $D^5$ $D^5$ to engage the knife-edged projections $D^6$ $D^6$ on the beam portion C. Attached to this receptacle device at one end is the handle $D^7$, whereby it may be rotated on its trunnions. The receptacle device is thus mounted on the scale-beam, but capable of oscillating thereon. Each of the receptacles is provided with an opening $D^8$ and is partially covered by the board $D^9$. They are also preferably filled in inside, as indicated at $D^{10}$, so as to give a good and free delivery to their contents through such opening underneath the board $D^9$ when the receptacle device is tilted down in the position for discharging.

It is obvious that if the hopper is well supplied with material and the worm be operated there will be a steady flow of material through the discharge-spouts $B^6$, and each of these will discharge into its associated receptacle in the receptacle device so long as the beam is in the position shown in the full lines in Fig. 2, for in that event the deflector $C^{16}$ will be in position to permit this action. As soon as an amount measured by the weights has passed into the receptacles the receptacle device will descend, the beam will rise, the deflector will be carried with it in the position shown in dotted lines in Fig. 2, and the material will continue to be discharged into some receiver or lower bin, (not here shown,) from which it will be carried up to the supply place again. When the parts have assumed this position, the lever $C^{15}$ can be operated to hold them there, and then by means of the handle $D^4$ the receptacle device can be rotated until its several receptacles will discharge each its contents into the properly-situated bag, box, or receiving device. As previously suggested, it will be seen that the error, if any, of the scale is distributed over the several receptacles and that while each may differ from the other in respect to the quantity which it contains their total will be closely measured by the scale and but a single error, and that probably a relatively small one, will be made in the filling of all of the bags, though there may be differences among the individual bags or packages.

Of course it will be understood that I am not here endeavoring to exhibit any of those numerous forms of packages—such as bags, boxes, cartons, and the like—which may be utilized to receive each its appropriate amount, nor do I here illustrate nor attempt to describe any of the several means by which packages may be filled. I desire to show here simply the measuring device or the portion of my invention which has to do with the measuring, and, as previously suggested, I wish my illustrations to be taken in the broadest sense as diagrammatic and my descriptions as intended to explain generally the subject of my invention by reference to specific illustrations thereof.

The use and operation of my invention have been probably sufficiently set forth in the foregoing; but I will review the matter in more general terms. The material is fed or supplied in any desired manner into a suitable receptacle, where it may be weighed in bulk or not, as desired. Such bulk is fed into a series of small compartments or receptacles more or less slowly. If the bulk of material is not measured before it is fed into the small receptacles, then it should be measured by a bulk-measuring device which measures all such receptacles or their contents. The contents of such several small receptacles is then discharged into the proper bags, boxes, cartons, or the like. Obviously if one desired to divide the material into unequal packages it would only be necessary to arrange the devices so that a larger quantity would fall into the receptacle intended to contain a larger quantity of material. These parts, however, would be properly proportioned, so that each receptacle would receive approximately its required amount.

I claim—

1. In a machine for determining the amount of materials for packages, the combination of a series of receptacles to receive each the amount intended for one package, with a weighing device to weigh the total quantity of material in a series of such receptacles.

2. In a machine for determining the amount of materials for packages, the combination of a series of receptacles to receive each the amount of material intended for one package with means for supplying such receptacles with material, and a weighing device to weigh the total amount of material in a series of such receptacles.

3. In a machine for determining the amount of materials for packages, the combination of a series of receptacles to receive each the amount of material intended for one package, with means for supplying such receptacles with material, and a weighing device to weigh the total amount of material in a series of such receptacles, and a cut-off to stop the supply when the total amount of material intended for such series of receptacles has been supplied to them.

4. In a machine for determining the amount of materials for packages, the combination of a supply adapted to feed to a series of receptacles, one for each package, with a weighing device associated with a series of said receptacles and adapted to respond when the receptacles have received the total amount of material intended for such series.

5. In a machine for determining the amount of materials for packages, the combination of a supply adapted to feed to a series of receptacles, one for each package, with a weighing device associated with a series of said receptacles and adapted to respond when the receptacles have received the total amount of material intended for such series, and means for stopping the supply when the weighing device so responds.

6. In a machine for determining the amount of materials for packages, the combination of a series of receptacles, each to receive approximately the amount of material intended for one package, with a weighing device which is adapted to weigh the total amount of material required for all of such receptacles.

7. In a machine for determining the amount of materials for packages, the combination of a series of receptacles, each to receive approximately the amount of material intended for one package, with a scale-beam on which such receptacles are mounted in opposition to a weight intended to balance such receptacles when they have received the total amount intended for such series.

8. In a machine for determining the amount of materials for packages, the combination of a series of receptacles, each to receive approximately the amount of material intended for one package, with a scale-beam on which such receptacles are mounted in opposition to a weight intended to balance such receptacles when they have received the total amount intended for such series, and means for cutting off the supply when the required amount has been placed in the receptacles.

9. In a machine for determining the amount of materials for packages, the combination of a series of receptacles, each to receive approximately the amount of material intended for one package, with a scale-beam on which such receptacles are mounted in opposition to a weight intended to balance such receptacles when they have received the total amount intended for such series, and means for cutting off the supply when the required amount has been placed in the receptacles, said means automatically operated by the operation of the scale.

10. In a machine for determining the amount of materials for packages, the combination of a supply device adapted to supply material to a series of receptacles, with such series of receptacles adapted to receive each the amount of material intended for one package, and a scale on which said series of receptacles are mounted, a weight to balance the series of receptacles when they receive the total amount intended for the series of packages, and a cut-off automatically operated by the scale to cut off the supply when the total amount has been received.

11. In a machine for determining the amount of materials for packages, the combination of a series of receptacles adapted to receive each the amount of material intended for one package, with a scale-beam on which they are mounted, and a lever-arm in the path of such scale-beam adapted to lock it in position when the receptacles have received the proper amount.

12. In a machine for determining the amount of materials for packages, the combination of a series of receptacles, each intended to receive the material intended for one package, with a supply device adapted to simultaneously feed material into each of said receptacles, a scale on which said receptacles are movably supported, and means for moving said receptacles on such scale to successively bring them to the positions of emptying and filling.

13. In a machine for determining the amount of materials for packages, the combination of a series of receptacles intended each to contain approximately the amount of material necessary for one package, with means for simultaneously supplying said receptacles and means for determining the total amount of material in all of said receptacles.

14. In a machine for determining the amount of materials for packages, the combination of a series of receptacles intended each to contain approximately the amount of material necessary for one package, with means for simultaneously supplying said receptacles and means for determining the total amount of material in all of said receptacles.

15. In a machine for determining the amount of materials for packages, the combination of a series of receptacles adapted each to receive approximately the amount of material intended for one package, with means for simultaneously feeding said receptacles, and a scale for determining when the total amount intended for said series of receptacles has been received by them.

16. In a machine for determining the amount of materials for packages, the combination of a series of receptacles adapted each to receive approximately the amount of material intended for one package, with means for simultaneously feeding said receptacles, and a scale for determining when the total amount intended for said series of receptacles has been received by them, and means for cutting off the supply.

17. In a machine for determining the amount of materials for packages, the combination of a series of receptacles adapted each to receive approximately the amount of material intended for one package, with
5 means for simultaneously feeding said receptacles, and a scale for determining when the total amount intended for said series of receptacles has been received by them, and means for cutting off the supply, such means operated automatically by the scale.

ADELMER M. BATES.

Witnesses:
 PHILIP A. FRYE,
 JAS. WARNOCK.